United States Patent [19]
Browning et al.

[11] Patent Number: 6,006,247
[45] Date of Patent: Dec. 21, 1999

[54] METHOD AND SYSTEM FOR SCHEDULING THREADS AND HANDLING EXCEPTIONS WITHIN A MULTIPROCESSOR DATA PROCESSING SYSTEM

[75] Inventors: Luke Matthew Browning; Jeffrey Scott Peek, both of Austin, Tex.

[73] Assignee: International Business Machines Corporation, Armonk, N.Y.

[21] Appl. No.: 08/807,516

[22] Filed: Feb. 27, 1997

Related U.S. Application Data

[63] Continuation of application No. 08/408,660, Mar. 21, 1995, abandoned.

[51] Int. Cl.[6] .................................................. G06F 9/40
[52] U.S. Cl. .......................................................... 709/102
[58] Field of Search ...................... 395/672, 670, 395/673, 674, 677, 676, 650, 700; 709/102, 104, 106, 107, 100; 364/200

[56] References Cited

U.S. PATENT DOCUMENTS

| | | | |
|---|---|---|---|
| 4,459,664 | 7/1984 | Pottier et al. ............................ | 364/200 |
| 4,748,558 | 5/1988 | Hirosawa et al. ...................... | 364/200 |
| 4,920,487 | 4/1990 | Baffes .................................... | 364/300 |
| 5,168,566 | 12/1992 | Kuki et al. ............................. | 395/650 |
| 5,179,702 | 1/1993 | Spix et al. .............................. | 395/650 |
| 5,193,186 | 3/1993 | Tamaki et al. .......................... | 395/650 |
| 5,222,229 | 6/1993 | Fukuda et al. ......................... | 395/550 |
| 5,261,053 | 11/1993 | Valencia ................................. | 395/200 |
| 5,271,013 | 12/1993 | Gleeson ................................. | 371/9.1 |
| 5,293,620 | 3/1994 | Barabash et al. ...................... | 395/650 |
| 5,317,738 | 5/1994 | Cochcroft, Jr. et al. ............... | 395/650 |
| 5,349,656 | 9/1994 | Kaneko et al. ......................... | 395/650 |
| 5,452,452 | 9/1995 | Gaetner et al. ........................ | 395/650 |
| 5,485,626 | 1/1996 | Lawlor et al. .......................... | 395/650 |
| 5,515,538 | 5/1996 | Kleiman ................................. | 395/733 |
| 5,632,032 | 5/1997 | Ault et al. .............................. | 395/670 |

OTHER PUBLICATIONS

"Performance Comparison of Real–Time Architectures Using Simulation", Heejo Lee et al, Real Time Computing Systems and applications, 1995 2nd International Workshop.

"Task Pair—Scheduling; An approach for dynamic Real–Time Systems" Hermann Streich, Parallel and Distributed Real Time System, 1994.

*Primary Examiner*—Alvin E. Oberley
*Assistant Examiner*—Sue Lao
*Attorney, Agent, or Firm*—Leslie A. Van Leeuwen; Brian F. Russell; Andrew J. Dillon

[57] ABSTRACT

A method and system are disclosed for handling exceptions generated by a particular processor among a number of processors within a multiprocessor data processing system. The data processing system includes a global queue from which threads are dispatched in a priority order for execution by the processors and a number of local dispatch flags, which are each associated with one of the processors. In response to an occurrence of an exception during execution of a particular thread by a particular processor, a state of the particular thread, which is at least partially defined by volatile data within the particular processor, is saved. A selected exception handler associated with the exception is then executed. Next, a determination is made whether resumption of the particular thread depends upon an occurrence of a specified event. In response to determining that resumption of the particular thread depends upon an occurrence of the specified event, the local dispatch flag associated with the particular processor is set. Thereafter, a determination is made whether the particular thread can be interrupted by another thread. In response to the local dispatch flag associated with the particular processor not being set or in response to determining that the particular thread cannot be interrupted by another thread, the particular thread is resumed. In response to the local dispatch flag associated with the particular processor being set and a determination that the particular thread can be interrupted by another thread, a thread is selected from the global queue for execution by the particular processor.

12 Claims, 7 Drawing Sheets

METHOD AND SYSTEM FOR SCHEDULING THREADS AND HANDLING EXCEPTIONS WITHIN A MULTIPROCESSOR DATA PROCESSING SYSTEM

This is a continuation, of application Ser. No. 08/408,660, filed Mar. 21, 1995, now abandoned.

BACKGROUND OF THE INVENTION

1. Technical Field

The present invention relates in general to a method and system for improved data processing and in particular to an improved method and system for data processing within a multiprocessor data processing system. Still more particularly, the present invention relates to an improved method and system for handling exceptions within a multiprocessor data processing system.

2. Description of the Related Art

Data processing systems typically include facilities which enable a processor to interrupt the current thread of processing in response to interrupts generated by external signals and exceptions generated by processing the current thread of execution. An example of an exception is a page fault in a data processing system utilizing a virtual memory system.

In data processing systems having a single processor, interrupts and exceptions are usually handled utilizing a three step process. First, the context of the processor at the time the interrupt or exception was received is stored within temporary storage, such as the processor's internal stack. The processor context includes not only an indication of which instruction within the thread to execute subsequent to handling the interrupt or exception, but also the value of data and status registers within the processor.

After the processor context is saved, the interrupt or exception is mapped to a particular memory address which stores the first instruction of an interrupt or exception handling routine (i.e., interrupt vector) associated with the particular interrupt or exception. The interrupt or exception handler is then executed. Finally, upon completion of the handler, the former context of the processor is restored by loading the processor data and status register values from the temporary storage area. Thereafter, processing of the thread is resumed beginning with the specified instruction.

In general, a similar approach to handling interrupts and exceptions is applicable to multiprocessor data processing systems. However, additional complications arise in a multiprocessor environment due to the ability of a multiprocessor data processing system to execute a number of threads simultaneously. A typical multiprocessor data processing system has both a global and local execution queues. Threads are assigned from the global execution queue to a particular local execution queue associated with a processor on the basis of affinity, that is, threads having a high degree of shared resource utilization are assigned to the same local execution queue.

When an exception occurs on a particular processor within a multiprocessor data processing system, the processor typically follows the three step exception handling process described above. If execution of the thread interrupted by the occurrence of an interrupt or exception cannot continue upon completion of the handler, for example, if execution depends upon a condition precedent that has not occurred, execution of the interrupted thread is suspended and another thread within the local execution queue is selected to run. If no other threads are present within the local execution queue, the processor simply idles until the interrupted thread again becomes executable.

Because of the increased overhead associated with maintaining both global and local execution queues and the inefficiency of conventional multiprocessor data processing systems in maintaining load balancing, some manufacturers, and in particular International Business Machines Corporation, have developed multiprocessor data processing systems which utilize a single global execute queue from which threads are dispatched for execution by multiple processors. Although maintaining a single global execution queue promotes greater efficiency, a problem arises when implementing conventional exception handling techniques in these systems. For example, if a thread that generates an exception is placed in the global execution queue immediately following the exception, the thread might be scheduled on more than one processor at the same time. This potential scheduling conflict arises since threads on the global execution queue can be scheduled at any time by a dispatcher routine running on one of the multiple processors. If the thread interrupted by the exception is in a critical section of code when interrupted by the exception, the thread must be dispatched to maintain data integrity and to ensure that the system does not crash. If a thread in a critical section of code is placed on the global execution queue when the exception is handled and subsequently dispatched to a processor other than the original processor, the thread could then enter a critical section of code and be rescheduled on the processor on which the original exception occurred.

Consequently, it would be desirable to provide a method and system for handling exceptions within a multiprocessor data processing system which utilizes a global execution queue.

SUMMARY OF THE INVENTION

It is therefore one object of the present invention to provide an improved method and system for data processing.

It is another object of the present invention to provide an improved method and system for data processing within a multiprocessor data processing system.

It is yet another object of the present invention to provide an improved method and system for handling exceptions within a multiprocessor data processing system.

The foregoing objects are achieved as is now described. A method and system are disclosed for handling exceptions generated by a particular processor among a number of processors within a multiprocessor data processing system. The data processing system includes a global queue from which threads are dispatched in a priority order for execution by the processors and a number of local dispatch flags, which are each associated with one of the processors. In response to an occurrence of an exception during execution of a particular thread by a particular processor, a state of the particular thread, which is at least partially defined by volatile data within the particular processor, is saved. A selected exception handler associated with the exception is then executed. Next, a determination is made whether resumption of the particular thread depends upon an occurrence of a specified event. In response to determining that resumption of the particular thread depends upon an occurrence of the specified event, the local dispatch flag associated with the particular processor is set. Thereafter, a determination is made whether the particular thread can be interrupted by another thread. In response to the local dispatch flag associated with the particular processor not being set or in response to determining that the particular thread cannot be interrupted by another thread, the particular thread is resumed. In response to the local dispatch flag associated with the particular processor being set and a determination that the particular thread can be interrupted by another thread, a thread is selected from the global queue for execution by the particular processor.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
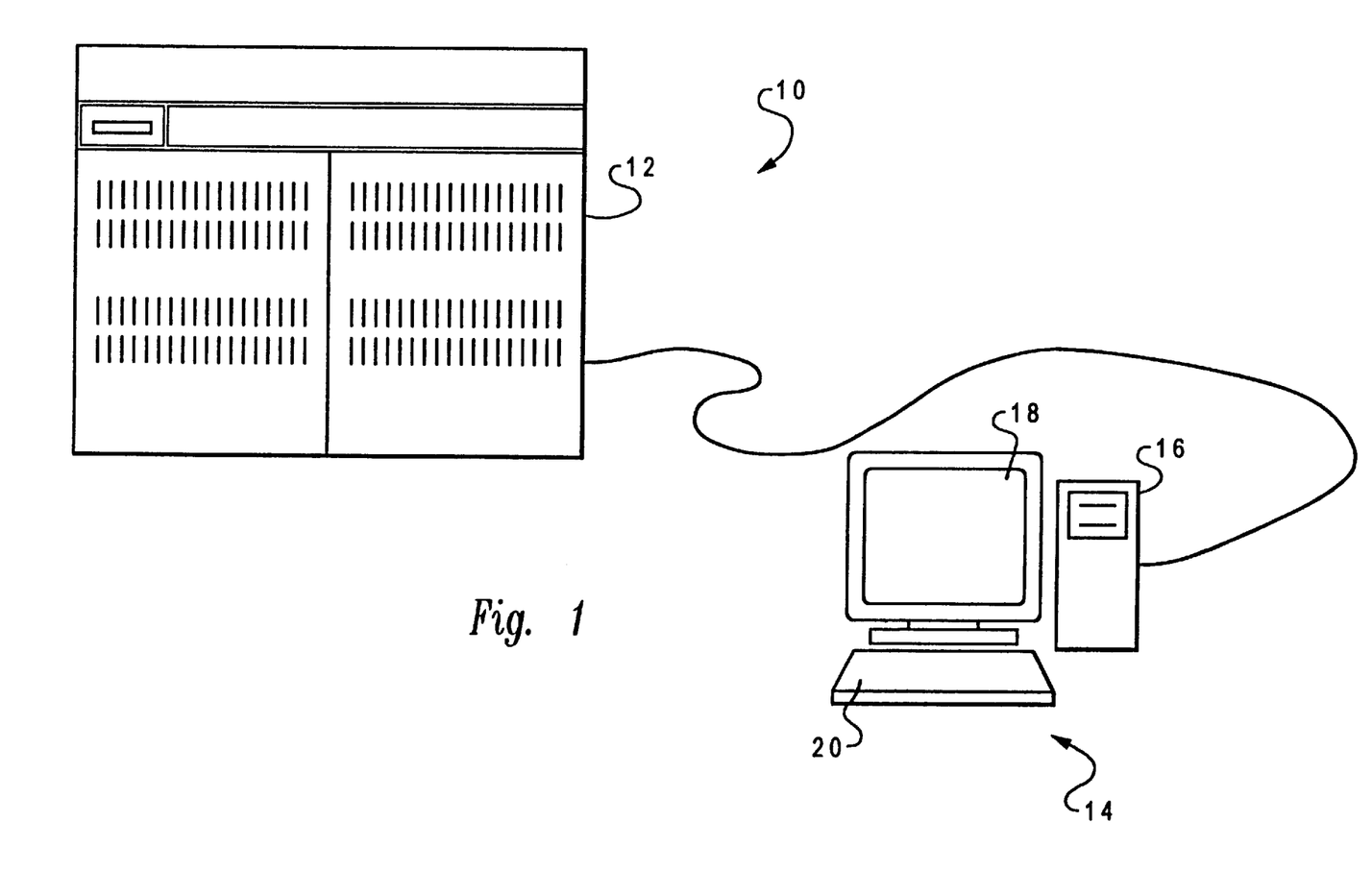
FIG. 1 illustrates a preferred embodiment of a multiprocessor data processing system which utilizes the method and system of the present invention.

With reference now to the figures and in particular with reference to FIG. 1, there is illustrated a preferred embodiment of a multiprocessor data processing system which employs the method and system of the present invention. As illustrated, data processing system 10 comprises system unit 12 and one or more local nodes 14, which include personal computer 16, display 18, and keyboard 20. As is well know to those skilled in the art, a user inputs data to personal computer 16 utilizing keyboard 20, or other suitable input device. The user may then process the data locally utilizing personal computer 16, or transmit the data from personal computer 16 to system unit 12 utilizing well-known networking techniques. According to the present invention, system unit 12 comprises a multiprocessor data processing system having multiple processors and a single global execution queue. Because system unit 12 can simultaneously execute a thread on each of its processors, system unit 12 provides greatly enhanced performance over personal computer 16. System unit 12 and personal computer 16 output data to a user via display device 18.

Figure 2:
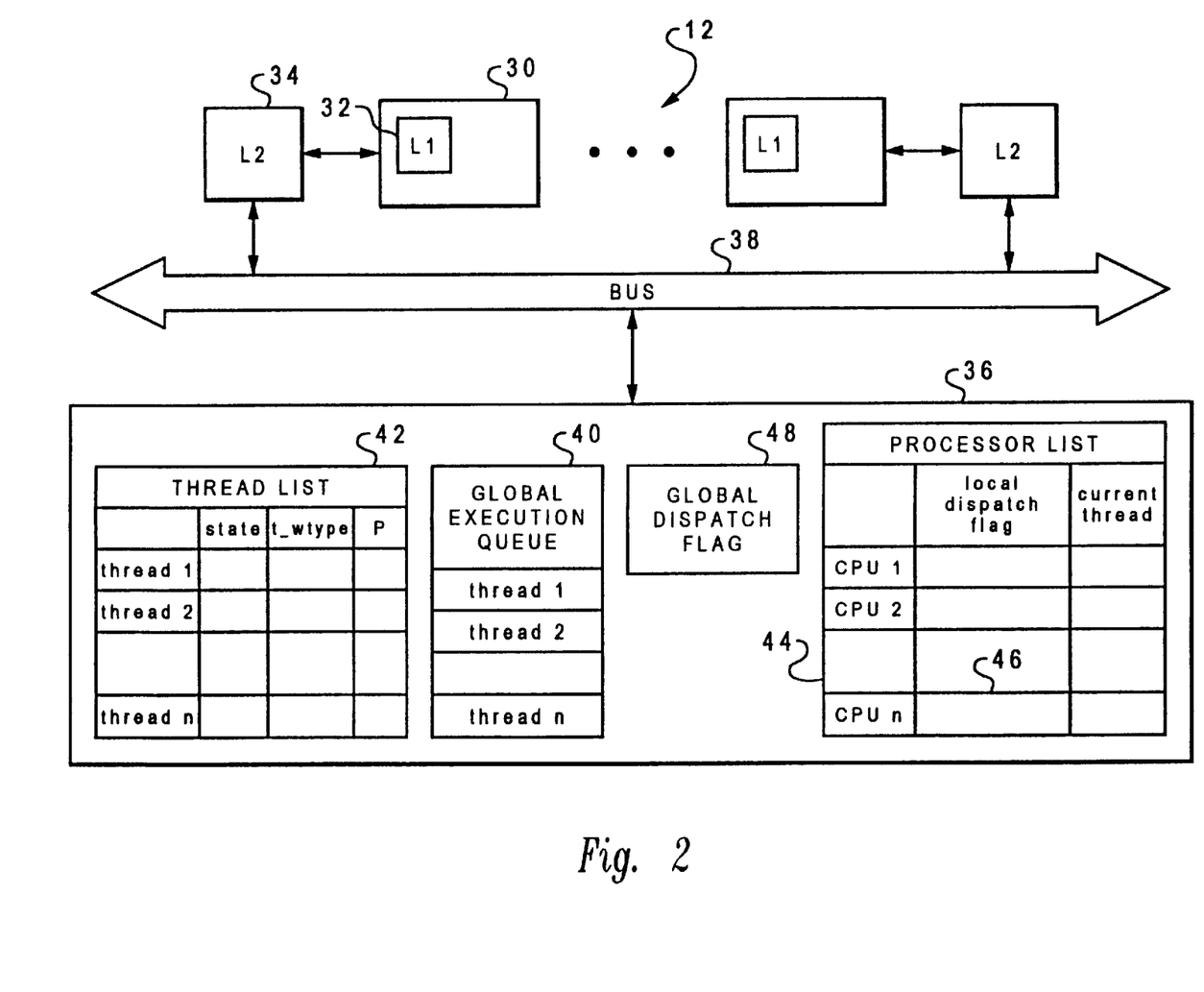
FIG. 2 depicts a block diagram of the system unit of the multiprocessor data processing system illustrated in FIG. 1.

Referring now to FIG. 2, there is depicted a block diagram of a preferred embodiment of system unit 12. System unit 12 includes a number of processors 30, which each include an on-board level 1 (L1) cache 32. Each L1 cache 32 comprises a small amount of high speed memory which stores a local copy of data utilized by its associated processor 30. When data requested by a processor 30 is not resident within its associated L1 cache 32, processor 30 will attempt to load the requested data from an associated L2 cache 34 which comprises a second level within the memory hierarchy. Each L2 cache 34 may be shared by multiple processors 30. When data requested by processor 30 is not resident within its associated L1 cache 32 or L2 cache 34, the data request is forwarded to global memory 36, which is accessible to each processor 30 via bus 38. As will be understood by those skilled in the art, global memory 36 may include one or more individual modules of physical memory.

In addition to storing data, global memory 36 includes global execution queue 40 which lists threads which are executable, but are not currently being executed by one of processors 30. As will be described in greater detail below, when a processor 30 requires a new thread to execute, processor 30 runs a dispatcher routine which selects a thread from global execution 40 for execution by processor 30. Global memory 36 also includes thread list 42, which specifies the state of each thread within system unit 12, including both threads within global execution queue 40 and those executing within processors 30. Possible states of threads will be described in greater detail with reference to FIG. 3. In addition to specifying the state of each thread, thread list 42 also indicates a priority (P) and a wait type (T_WTYPE) that further describes the thread state. In addition to tracking the execution of each thread, system unit 12 maintains processor list 44, which identifies the thread running on each processor 30. Processor list 44 also includes a local dispatch flag 46 for each processor 30 that may only be set by its associated processor 30. As will be described below, a processor 30 sets its associated local dispatch flag 46 to force a call to the dispatcher routine which selects a thread to run on processor 30.

Finally, global memory 36 includes global dispatch flag 48. Global dispatch flag 48 is set to indicate that the priority of a thread added to global execution queue 40 is greater than the priority of a thread currently being executed by one of processors 30. Setting global dispatch flag 48 forces a call to the dispatcher from the exception handling context to ensure that the highest priority threads within thread list 42 are executed while lower priority threads await execution on global execution queue 40. Although information within global memory 36 utilized to manage the operation of system unit 12 has been described with reference to global execution queue 40, thread list 42, processor list 44, and global dispatch flag 48, those skilled in the art will appreciate that a variety of different data structures may be implemented within global memory 36 to store this information.

Figure 3:
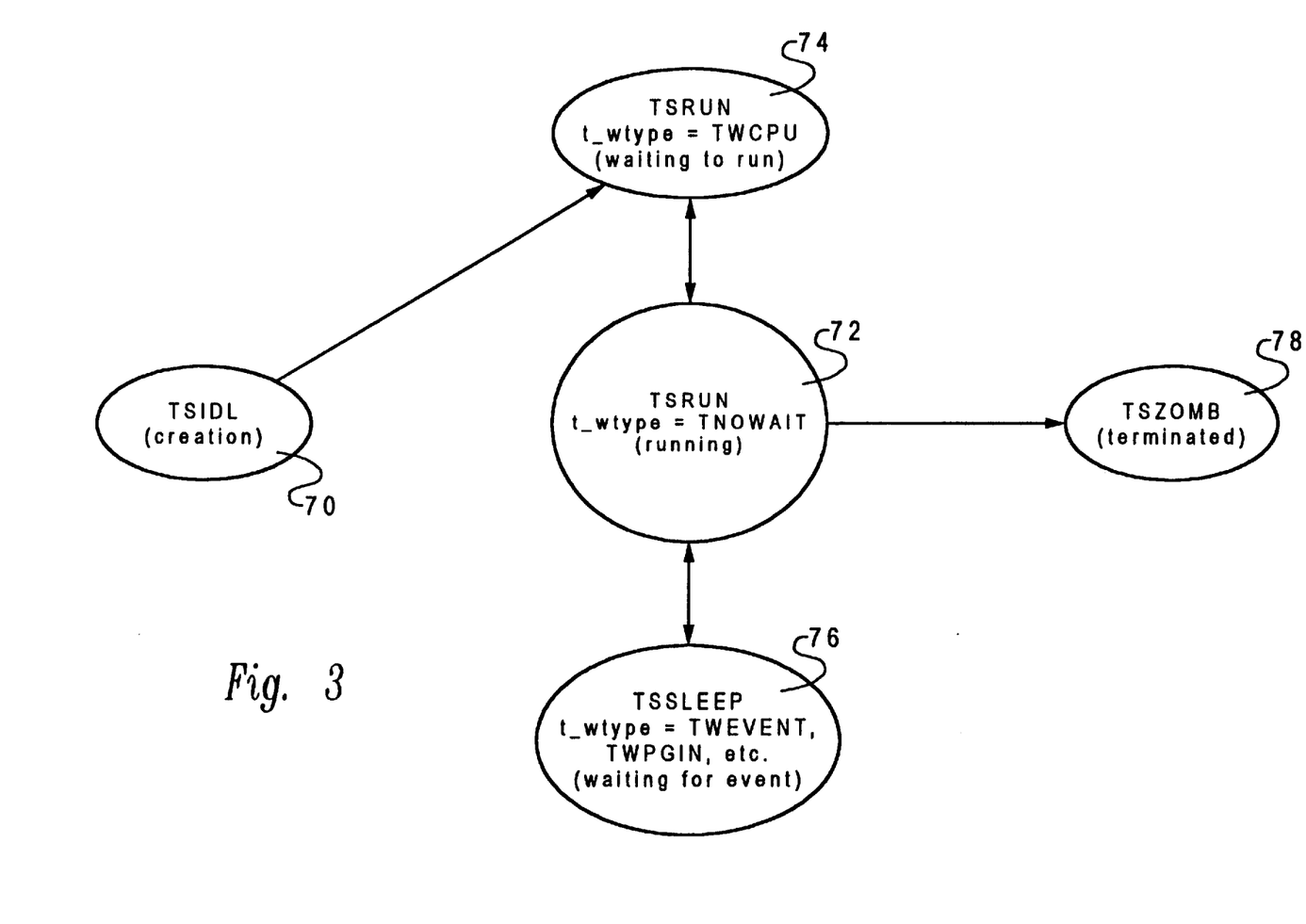
FIG. 3 is a state diagram illustrating possible execution states of threads within a multiprocessor data processing system utilizing the present invention.

With reference now to FIG. 3, there is illustrated a diagram of possible thread states. As illustrated, a thread originates at state 70 (TSIDL) and proceeds to state 74 (TSRUN), which represents the state of threads on global execution queue 40 waiting to run. The wait type of threads on global execution queue 40 is set to TWCPU, indicating that the threads are runnable, but lack a resource on which to run. When a thread is selected to run on a particular processor 30, the thread state makes a transition to state 72, which is the state of threads currently executing within one of processors 30. As indicted, when a thread is running, its wait type is TNOWAIT, specifying that execution of the thread is not waiting on an event or resource. While the thread is executing within a processor 30, the thread state can proceed from state 72 to either of states 74 (TSRUN) or 76 (TSSLEEP). A thread changing state from state 72 to state 74 indicates that execution of the thread by a processor 30 has been suspended and that the thread has been returned to global execution queue 40. As illustrated, when the thread is again dispatched to a processor 30 for execution, the thread state returns from state 74 to state 72. For example, when time slicing is implemented within system unit 12, a thread in state 72 that is executing within a processor 30 will make a state transition to state 74 when execution of the thread is preempted in favor of the next thread within global execution queue 40 which has the same priority as the current thread.

When a thread running in state 72 makes a state transition to state 76 (TSSLEEP), the thread is "put to sleep". In other words, execution of the thread is suspended until the occurrence of the event specified by the thread's associated wait type. For example, when a thread executed by a processor 30 within system unit 12 page faults, that is, when continued execution of the thread requires a page of virtual memory not resident within global memory 38, execution of the thread must be suspended until the required page is loaded from secondary storage. Thus, the thread is not waiting for a resource as at state 74, but is rather waiting on the occurrence of an event. Since threads which are sleeping are not available to be dispatched, threads in state 76 are not placed on global execution queue 40. Upon the occurrence of the event specified by a sleeping thread's wait type, the thread returns from state 76 to state 72. After execution of the thread is complete, the thread makes a final state transition from state 72 to state 78, where execution terminates.

Figure 4:
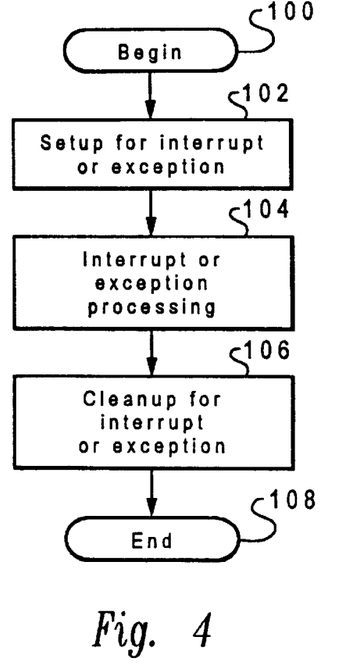
FIG. 4 depicts a flowchart of the method for processing exceptions within a multiprocessor data processing system utilized by the present invention.

Referring now to FIG. 4, there is depicted a flowchart of the method utilized by the present invention to process interrupts and exceptions within a multiprocessor data processing system. In general, interrupts can be processed by any processor 30 within system unit 12, but certain interrupts are preferably processed by particular processors. For example, to support time slicing on each processor, system unit 12 includes a system timer dedicated to each processor. When a timer interrupt occurs, signifying that the time quantum allotted to a particular thread has expired, the processor associated with the system timer processes the interrupt to select the next thread for execution. According to the present invention, exceptions generated by the execution of a thread are processed by the processor on which the exception occurs. Although the following description discusses the method illustrated in FIG. 4 with reference to an exception generated by the execution of a thread by a processor 30, those skilled in the art will appreciate that the described method may also be utilized to process interrupts received by processor 30.

Figure 5:
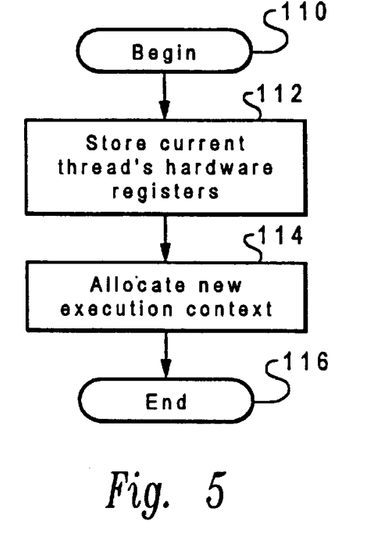
FIG. 5 illustrates a flowchart of the method utilized by the present invention to prepare to handle an exception.

Upon inspection of FIG. 4, it becomes apparent that the novel method utilized by the present invention to process interrupts and exceptions follows the basic format of interrupt processing employed by conventional data processing systems. The process begins at block 100 with the occurrence of an exception and thereafter proceeds to block 102, which depicts processor 30 preparing to process the exception by performing the operations depicted in FIG. 5. With reference now to FIG. 5, the setup for exception processing begins at block 110 and proceeds to block 112, which illustrates processor 30 saving the state of the current thread by storing the current thread's hardware registers. In a preferred embodiment of the present invention in which processor 30 comprises one of the PowerPC microprocessors available from IBM Microelectronics, processor 30 stores the state of the current thread within special purpose registers (SPRs) provided for exception handling purposes. After the state of the current thread is saved at block 112, the process proceeds to block 114, which depicts processor 30 allocating a new execution context in which to execute the exception handler. Thereafter, the process proceeds to block 116, which terminates the setup operations performed at block 102 of FIG. 4.

Figure 6:
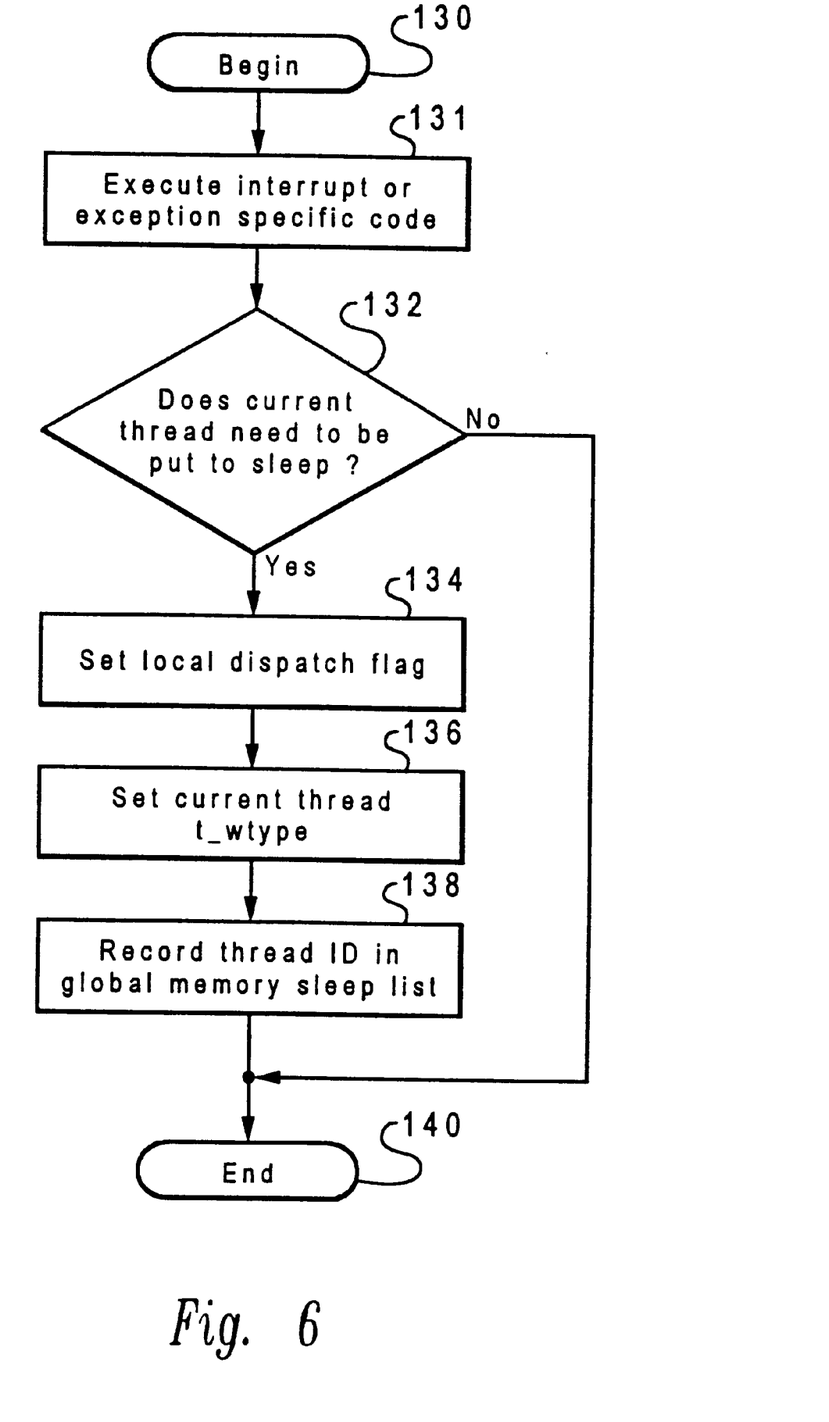
FIG. 6 is a flowchart depicting the execution of an exception handler according to the method of the present invention.

Returning to FIG. 4, the process proceeds from block 102 to block 104, which illustrates processor 30 executing the exception handler depicted in FIG. 6. Referring now to FIG. 6, there is depicted a flowchart of the exception handler executed by processor 30 within the new execution context. As illustrated, the process begins at block 130 and proceeds to block 131, which illustrates processor 30 executing the exception handler associated with the exception. As will be appreciated by those skilled in the art, each exception processed by processor 30 is mapped to a predetermined exception handler. Depending upon the source of the exception, the exception handler executed at block 131 may contain an instruction which sets local dispatch flag 46 associated with processor 30 to trigger a call to the dispatcher after the exception handler has completed. As an example from the interrupt context, if execution of the current thread was interrupted by a timer interrupt generated to enforce time slicing, the interrupt handler will contain an instruction which sets local dispatch flag 46 in order to force a call to the dispatcher to select a new thread to run on processor 30.

The process proceeds from block 131 to block 132, which depicts determining if the current thread needs to be put to sleep. As described with reference to FIG. 3, a thread is put to sleep (i.e., makes a state transition to state 76), if continued execution of the thread depends upon the occurrence of a specified event, such as receiving a new page of virtual memory from secondary storage. If the current thread needs to be put to sleep, the process proceeds to block 134, which illustrates setting local dispatch flag 46 associated with processor 30. Setting local dispatch flag 46 forces a call to the dispatcher after the completion of the exception handler to select a new thread to execute on processor 30. The process proceeds from block 134 to block 136, which illustrates processor 30 setting the wait type of the current thread to specify the event which will "wake up" the current thread. The wait type serves as a parameter to the dispatcher which indicates that a first step of a state transition between state 72 and state 76 has taken place. Later, when the dispatcher is executed by processor 30, the dispatcher will complete the state transition of the current thread to state 76 by setting the state of the current thread within thread list 42.

Next, at block 138, the process records the identifier of the current thread within a sleep list maintained in global memory 36. The sleep list simply lists all threads within system unit 12 which are in state TSSLEEP. As will be appreciated by those skilled in the art, threads that are asleep are not placed in global execution queue 40 since a sleeping thread cannot be dispatched prior to the occurrence of the event indicated by the thread's associated wait type. Thereafter, the process proceeds from either block 132 or block 138 to block 140, which returns the process to block 104 of FIG. 4.

Figure 7:
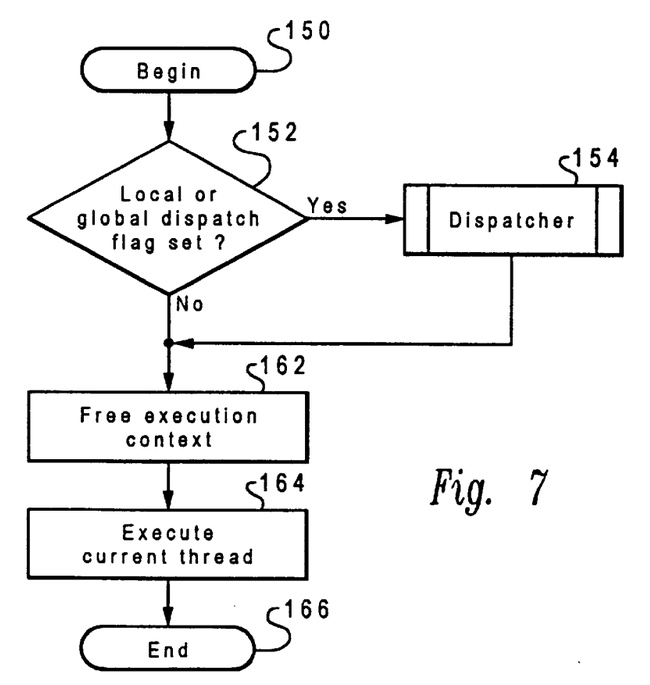
FIG. 7 is a flowchart illustrating the method utilized by the present invention to determine which thread should execute on a particular processor after the execution of an exception handler routine.

Returning to FIG. 4, the process proceeds from block 104 to block 106, which illustrates processor 30 determining which thread to run after the completion of the exception handler by executing the routine depicted in FIG. 7. With reference now to FIG. 7, the "clean up" operation begins at block 150 and then proceeds to block 152, which depicts determining if either local dispatch flag 46 associated with processor 30 or global dispatch flag 48 is set. As described above, global dispatch flag 48 comprises a counter having a range from 0 to N, where N is the number of processors 30 within system unit 12. Global dispatch flag 48 is set if global dispatch flag 48 has a value greater than 0. As will be described in greater detail with reference to FIG. 10, global dispatch flag 48 is incremented to indicate that a thread has been added to global execution queue 40 which has a priority higher than one of the threads running on a processor 30 within system unit 12. If either local dispatch flag 46 or global dispatch flag 48 is set, the dispatcher is executed by processor 30 at block 154.

Figure 8:
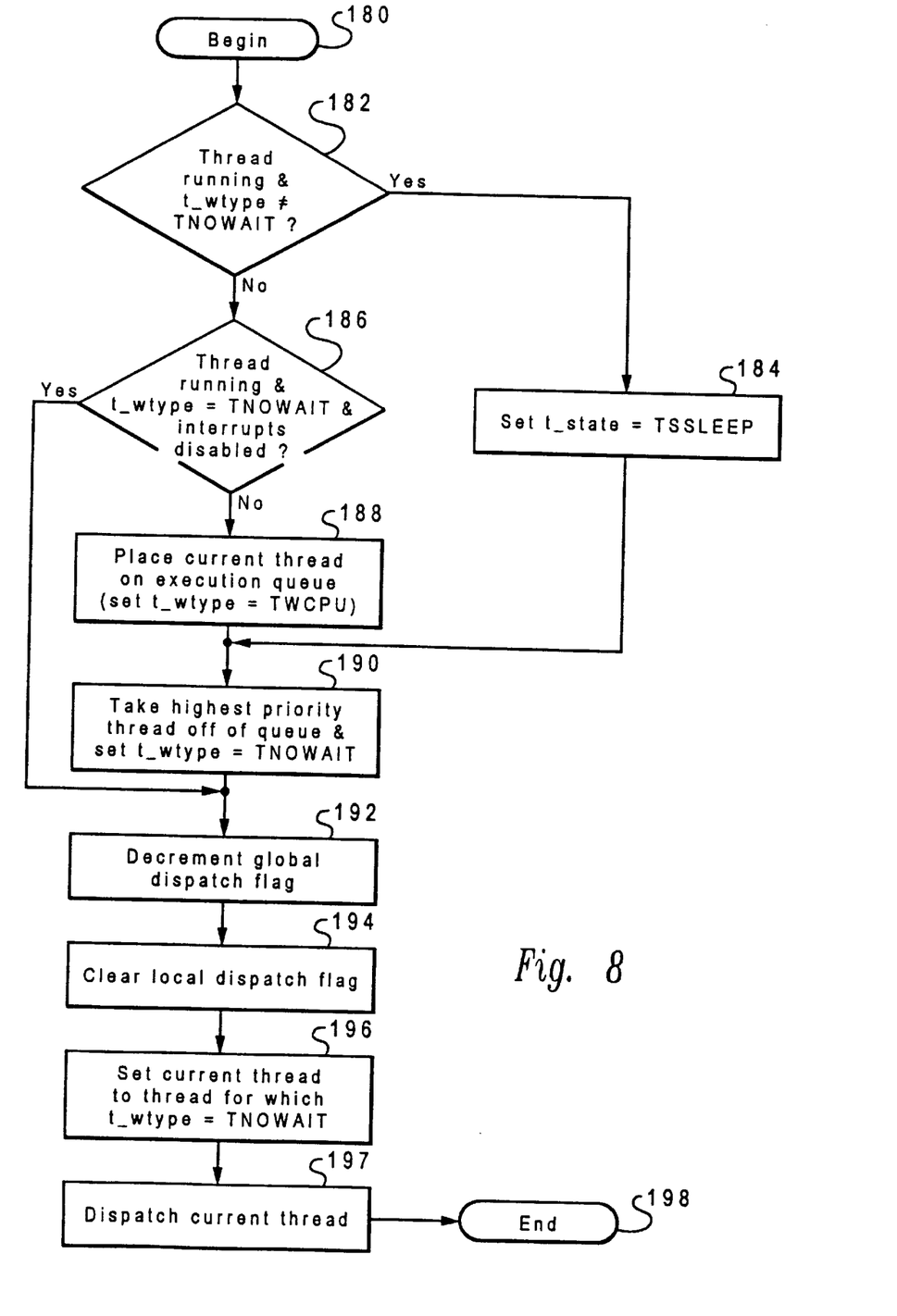
FIG. 8 depicts the method utilized by the present invention to dispatch a thread from the global execution queue to a particular processor.

Referring now to FIG. 8, there is depicted a flowchart of the dispatcher. As illustrated, the process begins at block 180 and thereafter proceeds to block 182, which depicts determining if the wait type of the current thread, that is, the thread whose execution was interrupted by the occurrence of the exception, is set to a wait type other than TNOWAIT. If the wait type of the current thread is set to a value other than TNOWAIT, then the wait type reflects the value set at block 136 of FIG. 6 which specifies the event upon which continued execution of the current thread depends. Thus, as described above, a wait type set to a value other than TNOWAIT serves as a parameter that indicates that the first step of a state transition between state 72 and state 76 has been performed and that the dispatcher should put the current thread to sleep. Accordingly, if the wait type of the current thread is set to a value other than TNOWAIT, the process proceeds to block 184, which illustrates the dispatcher setting the state of the current thread to TSSLEEP, thereby completing the state transition from state 72 to state 76. The process then proceeds to block 190.

Referring again to block 182 of FIG. 8, if the wait type of the current thread is set to TNOWAIT, the process determines at block 186 if the current thread was executing with interrupts disabled when the exception occurred. The execution of a thread with interrupts disabled indicates that the thread is in a critical code section which must be completed as quickly as possible to ensure data integrity and to avoid a system crash. If interrupts are disabled at block 186, the process then proceeds to blocks 192–197, which illustrate decrementing global dispatch flag 48, clearing local dispatch flag 46, and redispatching the current thread to processor 30. By redispatching a current thread if it is executing a critical code section with disabled interrupts, the present invention avoids the potential problem that can arise by the current thread being scheduled on more than one processor at the same time.

If, however, at block 186 the current thread is not executing with interrupts disabled, the process proceeds to block 188, which illustrates placing the current thread on global execution queue 40. Since each thread within global execution queue 40 is runnable but is lacking a resource on which to run, the wait type of the current thread is set to TWCPU, changing the state of the current thread from state 72 to state 74. Next, the process proceeds to block 190, which depicts determining which thread within global execution queue 40 has the highest priority and removing the selected thread from global execution queue 40. The wait type of the selected thread is also set to TNOWAIT at block 190, indicating that the selected thread should be dispatched next. The process proceeds from block 190 to block 192, which illustrates decrementing global dispatch flag 48 (if greater than 0) and thereafter clearing local dispatch flag 46 at block 194. The process then proceeds to block 196, which depicts designating the thread which has a wait type of TNOWAIT as the current thread of processor 30 within processor list 44. Thus, if the thread interrupted by the exception was determined to be executing with interrupts disabled at block 186, the interrupted thread remains the current thread of processor 30. Otherwise, a new thread is designated as the current thread of processor 30. The dispatcher then dispatches the current thread to processor 30 at block 197. Thereafter, the process terminates at block 198, returning the process to block 162 of FIG. 7.

Referring again to block 152 of FIG. 7, if neither local dispatch flag 46 nor global dispatch flag 48 is set, the current thread is selected to resume execution on processor 30. The process proceeds from either block 154 or block 152 to blocks 162 and 164, which depict enabling execution of the current thread by freeing the exception execution context and restoring the value of the hardware registers of processor 30. Thereafter, the process returns from block 166 to block 106 of FIG. 4. Finally, the exception handling process terminates at block 108.

Figures 9, 10:
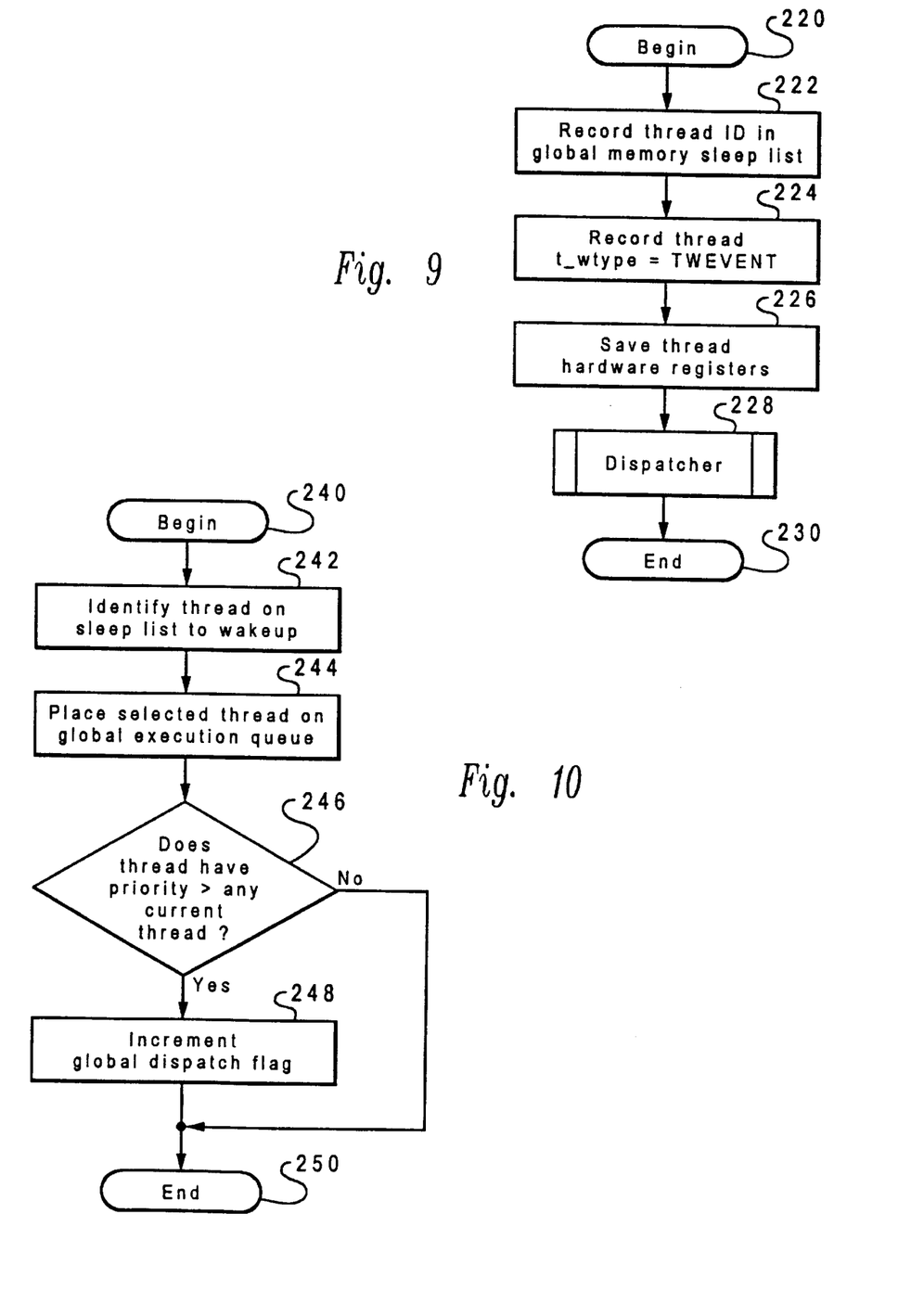
FIG. 9 illustrates the method utilized by the present invention to put a thread to sleep.
FIG. 10 depicts the method utilized by the present invention to wake up a sleeping thread.

Referring now to FIG. 9, there is illustrated a flowchart of the method utilized by the present invention to put a thread to sleep in response to a sleep request arising out of a context other than the exception handling context. The process is initiated at block 220, for example, by a thread's request to be put to sleep until data is loaded from secondary storage, and then proceeds to block 222, which depicts recording the thread identifier in the sleep list maintained in global memory 36. The wait type of the thread to be put to sleep is then set at block 224 to specify which event will wake up the requesting thread. The process proceeds to block 226, which illustrates saving the value of the hardware registers of processor 30 to enable resumption of the requesting thread upon the occurrence of the event indicated by the requesting thread's wait type. The process then calls the dispatcher depicted in FIG. 8 at block 228 to select another thread to run on processor 30. Finally, the sleep routine terminates at block 230.

Referring now to FIG. 10, there is depicted a flowchart of the process utilized by the present invention to wake up threads from the sleep list. The process begins at block 240, when an event specified by the wait type of a thread on the sleep list occurs. The occurrence of the event generates an interrupt which is processed according to the method illustrated in FIG. 10 by any processor 30 within system unit 12. The process proceeds from block 240 to block 242, which depicts processor 30 identifying which thread or threads on the sleep list within global memory 36 to wake up by comparing the event with the wait types associated with the threads in the sleep list. Once a thread has been identified at block 242, the process places the selected thread(s) on global execution queue 40 at block 244. The process then determines if the thread or threads inserted in global execution queue 40 at block 244 have a higher priority than any thread currently executing within a processor 30 within system unit 12. If a thread inserted into global execution queue 40 has a higher priority, the process proceeds to block 248, which illustrates incrementing global dispatch flag 48 once for each thread having a higher priority than a currently running thread. As described above, incrementing global dispatch flag 48 sets global dispatch flag 48, forcing a call to the dispatcher if global dispatch flag 48 remains set at block 152 of FIG. 7. Thereafter, the process proceeds from either block 246 or 248 to block 250, where the process terminates.

As has been described, the present invention provides an improved method and system for handling exceptions within a multiprocessor data processing system. By implementing global and local dispatch flags in conjunction with the sleep/wake up paradigm, the present invention avoids the problems which might arise by directly implementing conventional exception handling techniques in a multiprocessor environment.

While the invention has been particularly shown and described with reference to a preferred embodiment, it will be understood by those skilled in the art that various changes in form and detail may be made therein without departing from the spirit and scope of the invention.

What is claimed is:

1. A method, within a multiprocessor data processing system including a plurality of processors, for handling exceptions generated by said plurality of processors, wherein said multiprocessor data processing system has a global queue of multiple threads from which threads are dispatched for execution by said plurality of processors and a plurality of local dispatch flags, wherein each of said plurality of local dispatch flags is a storage location allocated to a respective one of said plurality of processors, said method comprising:

in response to an occurrence of an exception arising from execution of a particular thread by a particular processor among said plurality of processors, saving a state of said particular thread, wherein said state of said particular thread is at least partially defined by volatile data within said particular processor that is associated with said particular thread;

executing a selected exception handler associated with said exception;

determining whether or not resumption of said particular thread depends upon an occurrence of a specified event other than completion of said selected exception handler;

in response to said determination that resumption of said particular thread depends upon an occurrence of said specified event, setting a particular local dispatch flag among said plurality of local dispatch flags that is allocated to said particular processor;

in response to said particular local dispatch flag associated with said particular processor not being set, resuming execution of said particular thread on said particular processor following execution of said selected exception handler;

in response to said particular local dispatch flag being set, dispatching a thread from said global queue for execution by said particular processor following execution of said selected exception handler; and in response to dispatching a thread for execution by said particular processor, clearing said particular local dispatch flag associated with said particular processor regardless of whether said thread dispatched from said global queue is said particular thread.

2. The method for handling exceptions within a multiprocessor data processing system of claim 1, said method further comprising:

in response to determining during execution of said selected exception handler that a thread should be dispatched to said particular processor from said global queue following execution of said selected exception handler, setting said particular local dispatch flag regardless of whether said particular thread is in a runnable state.

3. The method for handling exceptions within a multiprocessor data processing system of claim 1, wherein resumption of said particular thread does not depend upon an occurrence of said specified event, said method further comprising:

in response to said particular local dispatch flag being set, placing said particular thread on said global queue prior to said step of dispatching from said global queue a thread for execution by said particular processor.

4. The method for handling exceptions within a multiprocessor data processing system of claim 1, wherein each thread within said multiprocessor data processing system is associated with a priority and threads are dispatched from said global queue according to priority order, said method further comprising:

determining if a thread has been added to said global queue that has a priority higher than a priority associated with one of a number of current threads executing within said plurality of processors; and in response to said determination that a thread has been added to said global queue that has a priority higher than a priority associated with one of said number of current threads, dispatching a thread from said global queue for execution by said particular processor according to said priority order following execution of said selected exception handler, even if said particular local dispatch flag is not set.

5. The method for handling exceptions within a multiprocessor data processing system of claim 1, wherein resumption of said particular thread depends upon an occurrence of said specified event, said method further comprising:

in response to an occurrence of said specified event, placing said particular thread on said global queue.

6. A multiprocessor data processing system, comprising:

a plurality of processors for executing threads, wherein in response to an occurrence of an exception arising from execution of a particular thread by a particular processor among said plurality of processors, a state of said particular thread that is at least partially defined by volatile data within said particular processor is saved, and wherein at least one of said plurality of processors executes a selected exception handler associated with said exception in response to said occurrence of said exception;

a global queue from which threads are dispatched to selected processors among said plurality of processors for execution;

a plurality of local dispatch flags, each of said plurality of local dispatch flags being a storage location allocated to a respective one of said plurality of processors, wherein a particular local dispatch flag among said plurality of local dispatch flags that is allocated to said particular processor is set in response to a determination that resumption of said particular thread depends upon an occurrence of a specified event, said specified event being an event other than completion of said selected exception handler;

means for resuming execution of said particular thread on said particular processor following execution of said selected exception handler if said particular local dispatch flag is not set;

means for dispatching a thread from said global queue for execution by said particular processor following execution of said selected exception handler if said particular local dispatch flag is set; and means for clearing said particular local dispatch flag in response to dispatching a thread for execution by said particular processor regardless of whether said thread dispatched from said global queue is said particular thread.

7. The multiprocessor data processing system of claim 6, and further comprising:

means for setting said particular local dispatch flag in response to determining during execution of said selected exception handler that a thread should be dispatched to said particular processor from said global queue following execution of said selected exception handler, wherein said means for setting sets said local dispatch flag regardless of whether said particular thread is in a runnable state.

8. The multiprocessor data processing system of claim 6, wherein resumption of said particular thread does not depend upon an occurrence of said specified event, said multiprocessor data processing system further comprising:

means, responsive to said particular local dispatch flag being set, for placing said particular thread on said global queue prior to dispatching from said global queue a thread for execution by said particular processor.

9. The multiprocessor data processing system of claim 6, wherein each thread within said multiprocessor data processing system is associated with a priority and threads are dispatched from said global dispatch queue according to priority order, said multiprocessor data processing system further comprising:

means for determining if a thread has been added to said global queue that has a priority higher than a priority associated with one of a number of current threads executing within said plurality of processors; and means, responsive to a determination that a thread has been added to said global queue that has a priority higher than a priority associated with one of said number of current threads, for dispatching a thread from said global queue for execution by said particular processor according to said priority order following execution of said selected exception handler, even if said particular local dispatch flag is not set.

10. The multiprocessor data processing system of claim 6, wherein resumption of said particular thread depends upon an occurrence of said specified event, said system further comprising:

means for placing said particular thread on said global queue in response to an occurrence of said specified event.

11. The method for handling exceptions within a multiprocessor data processing system of claim 1, and further comprising the steps of:

determining whether or not said particular thread is interruptible by another thread; and in response to a determination that said particular thread is not interruptible by another thread, resuming execution of said particular thread on said particular processor following execution of said selected exception handler whether or not said particular local dispatch flag is set.

12. The multiprocessor data processing system of claim 6, and further comprising:

means for determining whether or not said particular thread is interruptible by another thread; and means, responsive to a determination that said particular thread is not interruptible by another thread, for resuming execution of said particular thread on said particular processor following execution of said selected exception handler a whether or not said particular local dispatch flag is set.

* * * * *